United States Patent
Zhamu et al.

(10) Patent No.: US 8,883,114 B2
(45) Date of Patent: Nov. 11, 2014

(54) PRODUCTION OF ULTRA-THIN NANO-SCALED GRAPHENE PLATELETS FROM MESO-CARBON MICRO-BEADS

(75) Inventors: Aruna Zhamu, Centerville, OH (US); Jiusheng Guo, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1256 days.

(21) Appl. No.: 12/005,015

(22) Filed: Dec. 26, 2007

(65) Prior Publication Data

US 2009/0169467 A1    Jul. 2, 2009

(51) Int. Cl.
| | | |
|---|---|---|
| *C01B 31/04* | (2006.01) | |
| *C09C 1/56* | (2006.01) | |
| *B82Y 30/00* | (2011.01) | |
| *B82Y 40/00* | (2011.01) | |
| *C09C 1/44* | (2006.01) | |
| *C09C 1/46* | (2006.01) | |

(52) U.S. Cl.
CPC ............ *C01B 31/0469* (2013.01); *B82Y 30/00* (2013.01); *B82Y 40/00* (2013.01); *C01B 31/0415* (2013.01); *C09C 1/44* (2013.01); *C09C 1/46* (2013.01); *C09C 1/565* (2013.01); *C01B 2204/04* (2013.01); *C01B 2204/32* (2013.01); *C01P 2004/03* (2013.01); *C01P 2004/32* (2013.01)
USPC ........................................ 423/448; 423/460

(58) Field of Classification Search
USPC ................ 252/378 R; 423/445 R, 448, 460
See application file for complete search history.

(56) References Cited

U.S. PATENT DOCUMENTS

| | | |
|---|---|---|
| 3,434,917 A | 3/1969 | Kraus et al. |
| 3,885,007 A | 5/1975 | Olsen et al. |
| 4,091,083 A | 5/1978 | Hirschvogel et al. |
| 4,244,934 A | 1/1981 | Kondo et al. |
| 4,895,713 A | 1/1990 | Greinke et al. |
| 5,503,717 A | 4/1996 | Kang |
| 5,698,088 A | 12/1997 | Kang |
| 6,287,694 B1 | 9/2001 | Zaleski et al. |
| 6,596,396 B2 | 7/2003 | Hirata et al. |
| 6,872,330 B2 | 3/2005 | Mack et al. |
| 7,071,258 B1 | 7/2006 | Jang et al. |
| 7,105,108 B2 * | 9/2006 | Kaschak et al. .......... 252/378 R |

OTHER PUBLICATIONS

Yang, et al., Electrochemical performance of expanded mesocarbon microbeads as anode material for lithium-ion batteries, Electrochemistry Communications 2006; 8: 137-142.*
Fitzer, et al., Recommended Terminology for the Description of Carbon as a Solid, Pure & Appl. Chem. 1995; 67(3): 473-508.*

(Continued)

*Primary Examiner* — Daniel C McCracken

(57) ABSTRACT

A method of producing nano-scaled graphene platelets (NGPs) having an average thickness no greater than 50 nm, typically less than 2 nm, and, in many cases, no greater than 1 nm. The method comprises (a) intercalating a supply of meso-carbon microbeads (MCMBs) to produce intercalated MCMBs; and (b) exfoliating the intercalated MCMBs at a temperature and a pressure for a sufficient period of time to produce the desired NGPs. Optionally, the exfoliated product may be subjected to a mechanical shearing treatment, such as air milling, air jet milling, ball milling, pressurized fluid milling, rotating-blade grinding, or ultrasonicating. The NGPs are excellent reinforcement fillers for a range of matrix materials to produce nanocomposites. Nano-scaled graphene platelets are much lower-cost alternatives to carbon nanotubes or carbon nano-fibers.

21 Claims, 4 Drawing Sheets

(56) References Cited

OTHER PUBLICATIONS

U.S. Appl. No. 11/509,424, filed Aug. 25, 2006, Jang, et al.
U.S. Appl. No. 11/526,489, filed Sep. 26, 2006, Jang, et al.
U.S. Appl. No. 11/709,274, filed Feb. 20, 2007, Jang, et al.
U.S. Appl. No. 11/787,442, filed Apr. 17, 2007, Zhamu, et al.
U.S. Appl. No. 11/879,680, filed Jul. 19, 2007, Zhamu, et al.
U.S. Appl. No. 11/800,728, filed May 8, 2007, Zhamu, et al.

* cited by examiner

PRODUCTION OF ULTRA-THIN NANO-SCALED GRAPHENE PLATELETS FROM MESO-CARBON MICRO-BEADS

This invention is based on the research result of a US Department of Energy (DoE) Small Business Innovation Research (SBIR) project. The US government has certain rights on this invention.

FIELD OF THE INVENTION

The present invention relates to a method of producing nano-scaled graphene platelets (NGPs) from a class of carbonaceous material commonly referred to as meso-carbon microbeads (MCMBs) or carbonaceous micro spheres (CMS).

BACKGROUND

Carbon is known to have four unique crystalline structures, including diamond, graphite, fullerene and carbon nano-tubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and as composite reinforcements.

However, CNTs are extremely expensive due to the low yield and low production rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called nano-scaled graphene plates (NGPs). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications. The electronic, thermal and mechanical properties of NGP materials are expected to be comparable to those of carbon nano-tubes; but NGP will be available at much lower costs and in larger quantities.

Direct synthesis of the NGP material had not been possible, although the material had been conceptually conceived and theoretically predicted to be capable of exhibiting many novel and useful properties. Jang (one of the instant applicants) and Huang have provided an indirect synthesis approach for preparing NGPs and related materials [B. Z. Jang and W. C. Huang, "Nano-scaled Graphene Plates," U.S. Pat. No. 7,071,258 (Jul. 4, 2006)]. In most of the prior art methods for making separated graphene platelets, the process begins with intercalating natural graphite particles with an intercalation agent (also known as an intercalant or intercalate), followed by thermally expanding the intercalant to exfoliate the particles. The exfoliation step produces graphite worms, which are networks of interconnected graphite flakes or platelets. In some methods, the graphite worms are then subjected to air milling, ball milling, or ultrasonication to separate the graphite flakes or platelets. Conventional intercalation and exfoliation methods and recent attempts to produce exfoliated products or separated platelets are given in the following representative references:

1. J. W. Kraus, et al., "Preparation of Vermiculite Paper," U.S. Pat. No. 3,434,917 (Mar. 25, 1969).
2. L. C. Olsen, et al., "Process for Expanding Pyrolytic Graphite," U.S. Pat. No. 3,885,007 (May 20, 1975).
3. A. Hirschvogel, et al., "Method for the Production of Graphite-Hydrogensulfate," U.S. Pat. No. 4,091,083 (May 23, 1978).
4. T. Kondo, et al., "Process for Producing Flexible Graphite Product," U.S. Pat. No. 4,244,934 (Jan. 13, 1981).
5. R. A. Greinke, et al., "Intercalation of Graphite," U.S. Pat. No. 4,895,713 (Jan. 23, 1990).
6. F. Kang, "Method of Manufacturing Flexible Graphite," U.S. Pat. No. 5,503,717 (Apr. 2, 1996).
7. F. Kang, "Formic Acid-Graphite Intercalation Compound," U.S. Pat. No. 5,698,088 (Dec. 16, 1997).
8. P. L. Zaleski, et al. "Method for Expanding Lamellar Forms of Graphite and Resultant Product," U.S. Pat. No. 6,287,694 (Sep. 11, 2001).
9. J. J. Mack, et al., "Chemical Manufacture of Nanostructured Materials," U.S. Pat. No. 6,872,330 (Mar. 29, 2005).
10. M. Hirata and S. Horiuchi, "Thin-Film-Like Particles Having Skeleton Constructed by Carbons and Isolated Films," U.S. Pat. No. 6,596,396 (Jul. 22, 2003).

However, these previously invented methods have several serious drawbacks. Typically, exfoliation of the intercalated graphite occurred at a temperature in the range of 800° C. to 1,050° C. At such a high temperature, graphite could undergo severe oxidation, resulting in the formation of graphite oxide, which has much lower electrical and thermal conductivities compared with un-oxidized graphite. Most of the prior art processes make use of undesirable acids (e.g., strong sulfuric acid+potassium chlorate) as an intercalant. Further, most of the prior art processes do not have a good control over the NGP dimensions. The approach proposed by Mack, et al. [e.g., Ref. 9] is a low temperature process. However, Mack's process involves intercalating graphite with potassium melt, which must be carefully conducted in a vacuum or an extremely dry glove box environment since pure alkali metals, such as potassium and sodium, are extremely sensitive to moisture and pose an explosion danger. This process is not amenable to mass production of nano-scaled platelets.

To address these issues, we have recently developed several processes for producing nano-scaled platelets, as summarized in several pending patent applications [Refs. 11-16]:

11. Bor Z. Jang, Aruna Zhamu, and Jiusheng Guo, "Process for Producing Nano-scaled Platelets and Nanocomposites," U.S. Pat. Pending, Ser. No. 11/509,424 (Aug. 25, 2006).

12. Bor Z. Jang, Aruna Zhamu, and Jiusheng Guo, "Mass Production of Nano-scaled Platelets and Products," U.S. Pat. Pending, Ser. No. 11/526,489 (Sep. 26, 2006).
13. Bor Z. Jang, Aruna Zhamu, and Jiusheng Guo, "Method of Producing Nano-scaled Graphene and Inorganic Platelets and Their Nanocomposites," U.S. Pat. Pending, Ser. No. 11/709,274 (Feb. 22, 2007).
14. Aruna Zhamu, JinJun Shi, Jiusheng Guo, and Bor Z. Jang, "Low-Temperature Method of Producing Nano-scaled Graphene Platelets and Their Nanocomposites," U.S. Pat. Pending, Ser. No. 11/787,442 (Apr. 17, 2007).
15. Aruna Zhamu, Jinjun Shi, Jiusheng Guo and Bor Z. Jang, "Method of Producing Exfoliated Graphite, Flexible Graphite, and Nano-Scaled Graphene Plates," U.S. Pat. Pending, Ser. No. 11/800,728 (May 8, 2007).
16. Aruna Zhamu, Joan Jang, Jinjun Shi, and Bor Z. Jang, "Method of Producing Ultra-thin, Nano-Scaled Graphene Plates," U.S. Pat. Pending, Ser. No. 11/879,680 (Jul. 19, 2007).

For instance, Ref. [11,12] are related to processes that entail a pressurized gas-induced intercalation procedure to obtain a tentatively intercalated layered compound and a heating and/or gas releasing procedure to generate a super-saturation condition for inducing exfoliation of the layered compound. Tentative intercalation implies that the intercalating gas molecules are forced by a high gas pressure to penetrate into and reside tentatively in the interlayer spaces. Once the intercalated material is exposed to a higher temperature and/or a lower pressure environment, these gas molecules induce a high gas pressure that serves to push apart neighboring layers. Reference [13] is related to a halogen intercalation procedure, followed by a relatively low-temperature exfoliation procedure. No strong acid like sulfuric acid or nitric acid is used in this process (hence, no $SO_2$ or $NO_2$ emission) and halogen can be recycled and re-used. Disclosed in Ref. [16] is a method of producing ultra-thin NGPs that entail repeated intercalations and exfoliations of laminar graphite materials.

In all of aforementioned prior art methods and our co-pending applications, the process begins with intercalation of graphite-type materials, followed by gas pressure-induced exfoliation of the resulting intercalated graphite compound. The gas pressure is generated by heating and/or chemical reaction. However, intercalation by a chemical (e.g., sulfuric acid) may not be desirable. Exfoliation by heat can put graphite at risk of oxidation. After exfoliation, an additional mechanical shear treatment is normally needed to separate the exfoliated graphite into isolated platelets. In essence, every one of these processes involves three separate steps, which can be tedious and energy-intensive.

Furthermore, although prior art intercalation-exfoliation methods might be able to sporadically produce a small amount of ultra-thin graphene platelets (e.g., 1-5 layers), most of the platelets produced are much thicker than 2 nm (mostly thicker than 10 nm). The method provided in [Ref. 16] is the only exception, which is capable of consistently producing ultra-thin NGPs through repeated intercalations and exfoliations. Many of the NGP applications require the NGPs to be as thin as possible; e.g., as a supercapacitor electrode material. Hence, it is desirable to have a method that is capable of consistently producing ultra-thin NGPs.

Hence, it is an object of the present invention to provide a method of producing ultra-thin graphene platelets, with an average thickness smaller than 2 nm (or comprising less than 6 graphene layers per platelet).

It is a particular object of the present invention to provide a simple, fast, and less energy-intensive method of producing ultra-thin graphene platelets, without involving a long intercalation time, without using a high exfoliation temperature, or without a need for a subsequent mechanical shearing treatment (e.g., air milling).

It is another object of the present invention to provide a convenient method of producing nano-scaled graphene platelets without utilizing an undesirable intercalant, such as sulfuric acid.

Another object of the present invention is to provide an effective and consistent method of mass-producing ultra-thin, nano-scaled platelets.

It is still another object of the present invention to provide a method of producing ultra-thin, nano-scaled platelets that can be readily dispersed in a liquid to form a nanocomposite structure.

SUMMARY OF THE INVENTION

The present invention provides a method of producing separated nano-scaled graphene platelet (NGPs) having an average thickness no greater than 50 nm (typically less than 1 nm). The method comprises (a) intercalating a supply of meso-carbon microbeads (MCMBs) to produce intercalated MCMBs; and (b) exfoliating the intercalated MCMBs at a temperature and a pressure for a sufficient period of time to produce the desired NGPs.

MCMBs are usually obtained from a petroleum heavy oil or pitch, coal tar pitch, or polynuclear hydrocarbon material. When such a precursor pitch material is carbonized by heat treatment at 400° to 500°, micro-crystals called mesophase micro-spheres are formed in a non-crystalline pitch matrix. These mesophase micro-spheres, after being isolated from the pitch matrix (typically soluble in selected solvents), are often referred to as meso-carbon microbeads (MCMB). FIG. 3(A) shows a scanning electron micrograph of selected MCMBs used in the present study. The MCMBs may be subjected to a further heat treatment at a temperature in the range of 500° C. and 3,000° C.

In the present invention, the MCMBs obtained from heat-treating mesophase carbon spheres at a temperature in the range of 500° C. and 1,400° C. tend to lead to graphene platelets having a length smaller than 10 nm. The MCMBs obtained from heat-treating mesophase carbon spheres at a temperature higher than 2,500° C. can lead to the production of graphene platelets having a length greater than several hundreds of nanometers (e.g., FIG. 3(B)). In some cases, ultra-thin NGPs (1-3 graphene planes) with a length greater than 2 μm were obtained.

The step of intercalating may comprise chemical intercalating, electrochemical intercalating, gaseous phase intercalating, liquid phase intercalating, supercritical fluid intercalating, or a combination thereof. The step of intercalation may comprise using an intercalate selected from an acid, an oxidizing agent, a mixture of an acid and an oxidizing agent, a halogen molecule or inter-halogen compound, a metal-halogen compound, an alkali metal, a mixture or eutectic of two alkali metals, an alkaline earth metal, an alkali metal-organic solvent mixture, or a combination thereof. An environmentally benign intercalate, such as acetic acid, formic acid, or a carboxylic acid is preferred. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof.

The electrochemical intercalating may comprise using a carboxylic acid as both an electrolyte and an intercalate source. The electrochemical intercalating may comprise imposing an electric current, at a current density in the range of 50 to 600 A/m$^2$, to the MCMBs, which are used as an electrode material.

The step of exfoliating intercalated MCMBs comprises exposing the intercalated MCMBs to a temperature in the range of 150° C. to 1,100° C. In the case of using an acid as an intercalant, the step of exfoliating the intercalated MCMBs may comprise exposing the intercalated MCMBs to a temperature in the range of 150° C. to 300° C., which is a highly desirable feature not achievable in prior art exfoliation processes for acid-intercalated compounds.

The method may further comprise a step of contacting at least a part of the exfoliated MCMBs with a liquid selected from water, methanol, ethanol, other alcohol, acetone, an organic solvent, or a combination thereof. Surprisingly, such a contact tends to further separate the graphene platelets and aid in dispersion of the platelets in a desired liquid medium.

The method may further comprise a step of subjecting the exfoliated MCMBs, after step (b), to a mechanical shearing treatment selected from air milling, air jet milling, pressurized fluid milling, ball milling, rotating blade grinding, ultrasonicating, or a combination thereof. This shearing treatment further separates and could reduce the dimensions of NGPs.

In one preferred embodiment, the step of intercalation comprises exposing the MCMBs to a gaseous or supercritical fluid environment at a first temperature and a first pressure and the step of exfoliation comprises subjecting the intercalated MCMBs to a second temperature and a second pressure, wherein the first temperature is different from the second temperature or the first pressure is different from the second pressure. The gaseous or supercritical fluid environment may comprise carbon dioxide.

Another preferred embodiment of the present invention is a method of producing separated nano-scaled graphene platelets having an average thickness no greater than 50 nm (typically thinner than 2 nm). The method comprises (a) intercalating a supply of meso-carbon microbeads (MCMBs) with an alkali metal to produce intercalated MCMBs; and (b) exfoliating the alkali metal-intercalated MCMBs by contacting these MCMBs with a liquid to produce the nano-scaled graphene platelets. The alkali metal may comprise Li, Na, K, Rb, Cs, or an alloy or mixture containing at least one of these elements. The liquid may be selected from water, alcohol, ethanol, methanol, or an organic solvent.

It may be noted that Mack, et al [Ref. 9] did report that graphite nanoplatelets with thickness down to 2-10 nm could be synthesized by alkali metal intercalation followed by ethanol exfoliation and microwave drying. This was achieved by intercalating graphite with an oxidizing acid to form a graphite intercalation compound (GIC), exfoliating the GIC, re-intercalating the exfoliated graphite with an alkali metal to form a first-stage (Stage-1) compound, reacting the first-stage compound with ethanol to exfoliate the compound, and further separating the exfoliated graphite with microwave heating. In traditional GICs obtained by intercalation of a laminar graphite material, the intercalant species may form a complete or partial layer in an inter-layer space or gallery. If there always exists one graphene layer between two intercalant layers, the resulting graphite is referred to as a Stage-1 GIC. If n graphene layers exist between two intercalant layers, we have a Stage-n GIC.) That alkali metals react violently with water and alcohol implies that Mack's method can not be a safe and reliable process for mass-producing NGPs. Furthermore, although re-intercalation and re-exfoliation were used in this process and first-stage graphite compound was obtained, the resulting graphite platelets are no thinner than 2 nm. Most of the platelets are thicker than 10-15 nm even after further exfoliation and separation via microwave heating. Re-intercalation by liquid eutectic of sodium and potassium (NaK$_2$) and subsequent exfoliation yielded platelets with thicknesses of 2-150 nm. It seems that violent reactions between intercalated alkali metals and water or ethanol tend to result in highly non-uniform exfoliation. It is strange that with alkali metal-intercalated graphite being mostly Stage-1, the resulting platelets exhibit such a wide range of thicknesses (2-150 nm).

By contrast, our invented method consistently produces platelets with an average thickness thinner than 2 nm or 5 layers.

It may be further noted that, in our earlier inventions [B. Z. Jang and W. C. Huang, "Nano-scaled Graphene Plates," U.S. Pat. No. 7,071,258 (Jul. 4, 2006); and B. Z. Jang, "Process for Nano-scaled Graphene Plates," U.S. patent application Ser. No. 11/442,903 (May 31, 2006)], a process for producing NGPs was disclosed. This process included the steps of: (a) either partially or fully carbonizing a precursor polymer or heat-treating petroleum or coal tar pitch to produce a polymeric carbon containing micron- and/or nanometer-scaled graphite crystallites with each crystallite comprising one sheet or a multiplicity of sheets of graphite plane; (b) exfoliating the graphite crystallites in the polymeric carbon; and (c) subjecting the polymeric carbon containing exfoliated graphite crystallites to a mechanical attrition treatment to produce the nano-scaled graphene plate material. This earlier method was fundamentally and patently different from the method or process of the instant application in several ways:

(1) The starting material in the earlier method was a polymer or a pitch material. After a thermal treatment, the material became a polymeric carbon, which typically still contains a significant portion of non-graphene carbon materials or even non-carbon elements. Typically, the majority component of a polymeric carbon is amorphous carbon. By contrast, the majority of the MCMB is a highly ordered structure since the majority of non-crystalline moieties have been extracted out during the MCMB production process.

(2) The polymeric carbons used in earlier inventions were bulk materials with graphite crystallites randomly oriented in an amorphous matrix. Even after pulverization, the resulting particles are highly irregular in shape. By contrast, the MCMBs used in the instant application are well-defined in shape, mostly spherical. It is generally believed that the constituent graphite crystallites or graphene layers in a MCMB essentially trace out a number of cylindrical discs that constitute a sphere. These traces of graphene layers are essentially parallel to one another and are substantially perpendicular to an axis between the north pole and south pole of a sphere. Each MCMB bead has edges of graphene layers exposed on the exterior surface of the bead, allowing an intercalating agent to penetrate into the bead relatively easily and relatively uniformly from all directions. This feature, coupled with the notion that the MCMBs are just microns in size, allows intercalation to be completed very rapidly. In contrast, chemical intercalation of the bulk polymeric carbon material has proven much more difficult. Even after pulverization into finer particles, each particle is still covered with a layer of amorphous carbon through which an intercalant must permeate before reaching the crystalline zones. It took a much longer time for intercalation to be completed.

(3) We have surprisingly found that exfoliation of intercalated MCMBs often naturally led to good separation of the constituent graphene sheets. Generally, a mechanical attrition treatment is not required in separating the NGPs in exfoliated MCMBs. Nevertheless, a mechanical shearing treatment may be used to further reduce the dimensions of NGPs obtained from MCMBs. By contrast, a mechanical shearing treatment was necessary in the case when a polymeric carbon was involved.

Additional advantages of the presently invented method will become more apparent after detailed description of the method and illustrative examples is presented in what follows.

DETAILED DESCRIPTION OF PREFERRED EMBODIMENTS

Figure 1:
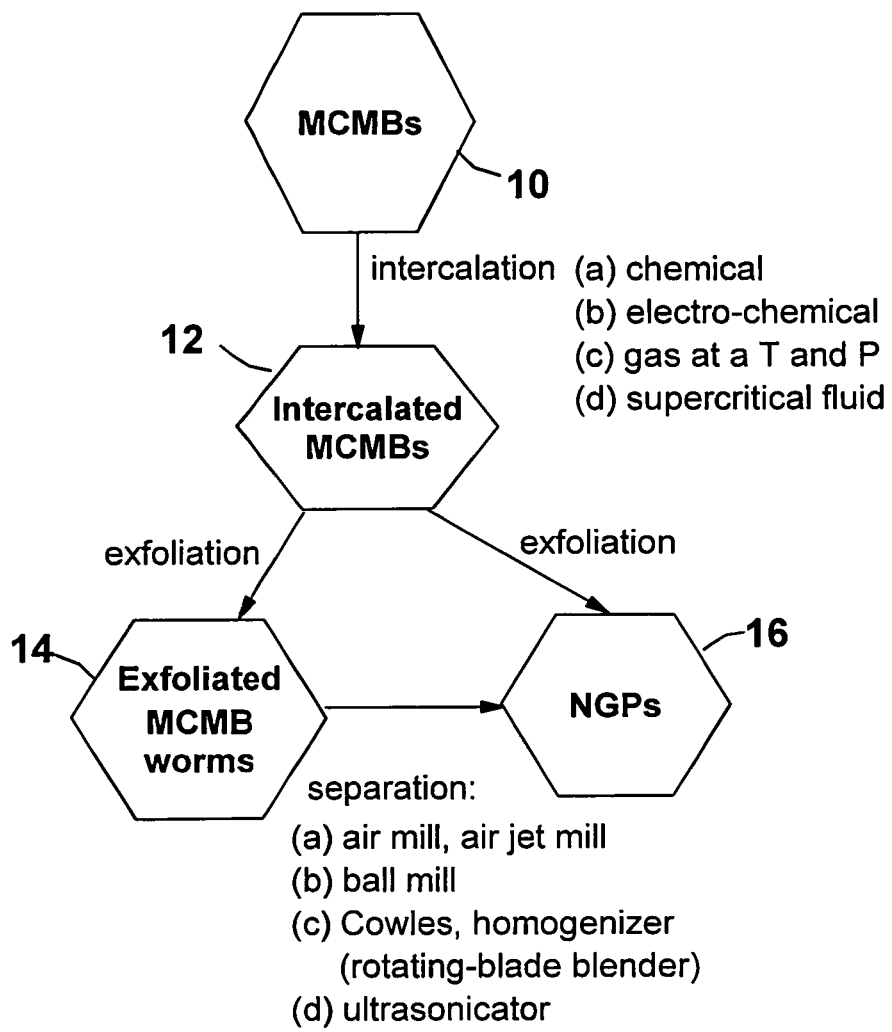
FIG. 1 A flow chart showing the processes for producing ultra-thin graphite platelets (NGPs with an average thickness typically thinner than 2 nm or 5 layers) from MCMBs.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Petroleum- or coal-derived pitch is a mixture of polynuclear hydrocarbons with an average molecular weight of approximately 200 amu. Upon heating to approximately 200° C., pitch becomes fluid or gets melted. In the melt, the translational energy afforded to molecules by the temperature overcomes the cohesion energy. However, at a higher temperature (e.g., >300° C.), dehydrogenation polymerization reactions occur, causing average molecular weight to increase, which can reach 600-900 amu when the temperature is >400° C. As the molecules grow, the cohesive energy exceeds the translational energy, resulting in the homogeneous nucleation of a new phase, called the mesophase.

The polyaromatic molecules that constitute the mesophase pitch are discotic, with one axis much smaller than the other two axes. These molecules arrange themselves with the planes parallel to each other, forming nematic liquid crystals. The growing liquid crystal phase adopts a spherical shape to minimize surface energy. Thus, the mesophase creates microbeads, which could have diameters up to 100 µm.

In real practice, the microbead-producing process begins with utilization of hydro-carbonaceous heavy oil such as petroleum heavy oil or petroleum pitch, coal tar pitch, or oil sand. When the pitch is carbonized by a heat treatment at 400° to 500°, micro-crystals called mesophase micro-spheres are formed in the heat-treated pitch. These mesophase microspheres are liquid crystals having a characteristic molecular arrangement that can be converted into highly crystalline carbonized products by subjecting them to a further heat treatment. These mesophase micro-spheres (typically insoluble), after being isolated from other (soluble) components of the heat-treated pitch, can be used for a wide scope of applications having high added values, such as serving as starting materials for carbon fibers, binders, and adsorbents. Isolated mesophase micro-spheres are often referred to as meso-carbon microbeads (MCMB), mesophase carbon spheres (MCS), or carbonaceous micro-spheres (CMS).

Several methods have been used for isolation of such mesophase microspheres from other components in a pitch, including solvent extraction, emulsification, centrifugal separation, and pressurized filtration. Using solvent extraction as an example, the pitch matrix containing these microspheres may be first selectively dissolved in quinoline, pyridine, or an aromatic oil such as anthracene oil, solvent naptha, or the like, with the mesophase microspheres being suspended as an insoluble component. The insoluble component in the resulting suspension is then isolated by solid-liquid separation.

The isolated mesophase microspheres or MCMB may be subjected to further heat treatments at a temperature typically in the range of 500° C. to 3,000° C., more typically in the range of 1,000° C. to 3,000° C., and most typically in the range of 2,000° C. to 3,000° C. A higher temperature heat treatment, such as typically in the range of 2,000° C. to 3,000° C., serves to graphitize the MCMBs by increasing the lateral or a-directional dimension (La) and thickness-directional or c-directional dimension (Lc) of graphite crystallites. Graphitization also effectively increases the degree of crystallization or decreases the proportion of amorphous or defected portion of a MCMB. The diameter of commercially available MCMBs is typically between 1 µm and 100 µm, but more typically between 5 µm and 40 µm.

To the best of our knowledge, no other research group has reported the results of producing nano-scaled graphene platelets (NGPs) from MCMBs. An NGP is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm.

Prior art NGPs are mostly produced from natural flake graphite particles. The length and width of a NGP produced from natural flake graphite are typically between 1 µm and 5 µm. For certain applications, both length and width of NGPs are preferably smaller than 1 µm. For instance, NGPs with shorter length and width can be more readily mixed with a polymer matrix to form a nanocomposite and the dispersion of such NGPs in the matrix is more uniform. We have surprisingly observed that, by starting with MCMBs heat-treated at a temperature of 350° C. to 1,400° C., we can readily obtain NGPs with length and width smaller than 100 nm (<0.1 µm), or even smaller than 10 nm.

Further, prior art processes for the preparation of NGPs typically begin with intercalation of graphite particles (mostly natural flake graphite) to form a graphite intercalation compound (GIC), followed by exfoliation of the GIC. Prior art methods mostly produce NGPs with an average thickness greater than 10 nm. It is also quite surprising that the presently invented method that entails intercalation and exfoliation of MCMBs readily produces ultra-thin NGPs having a thickness smaller than 2 nm. In most cases, the NGPs produced by this method are mostly single graphene, double-layer, or triple-layer platelets.

Hence, a preferred embodiment of the present invention is a method of producing separated nano-scaled graphene platelets (NGPs) having an average thickness no greater than 50 nm (typically less than 1 nm). The method comprises (a) intercalating a supply of meso-carbon microbeads (MCMBs) to produce intercalated MCMBs; and (b) exfoliating the intercalated MCMBs at a temperature and a pressure for a sufficient period of time to produce the desired NGPs.

Referring to FIG. 1, NGPs with a desired geometry can be obtained by using a method that comprises (a) intercalating MCMBs 10 with an intercalate (intercalating agent) to form an intercalated MCMB product 12; and (b) exfoliating the intercalated MCMB to obtain an exfoliated MCMB 14 comprising graphene sheets or platelets. In some cases, some of the graphene sheets or platelets may still somehow remain bonded to one another. Hence, in another preferred embodiment of the present invention, the method further comprises a step (c) of separating the graphene sheets or platelets to obtain nano-scaled graphene platelets 16. In many cases, the exfoliation step directly results in the formation of NGPs 16 (right hand side of FIG. 1) without an additional separation step. Hence, in these latter cases, step (c) is optional.

The step of intercalating may comprise chemical intercalating, electrochemical intercalating, gaseous phase intercalating, liquid phase intercalating, supercritical fluid intercalating, or a combination thereof. The chemical intercalating may comprise exposing the MCMBs to an intercalate (intercalating agent or intercalant) selected from sulfuric acid, sulfonic acid, nitric acid, a carboxylic acid, a metal chloride solution, a metal-halogen compound, halogen liquid or vapor, potassium permanganate, alkali nitrate, alkali perchlorate, an oxidizing agent, or a combination thereof. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Alternatively, the intercalant may comprise an alkali metal (e.g., Li, Na, K, Rb, Cs, or a combination thereof, such as a eutectic).

For an intercalate, the metal-halogen compound or halogen liquid or vapor may comprise a molecule selected from bromine ($Br_2$), iodine ($I_2$), iodine chloride (ICl), iodine bromide (IBr), bromine chloride (BrCl), iodine pentafluoride ($IF_5$), bromine trifluoride ($BrF_3$), chlorine trifluoride ($ClF_3$), phosphorus trichloride ($PCl_3$), phosphorus tetrachloride ($P_2Cl_4$), phosphorus tribromide ($PBr_3$), phosphorus triiodide ($PI_3$), or a combination thereof.

In the case of a chemical oxidation (using an acid as an intercalant, for instance), the method comprises:

(a) forming acid-intercalated MCMBs by a chemical oxidation reaction which, as examples, uses a combination of a sulfuric acid and nitric acid or a combination of carboxylic acid and hydrogen peroxide, as an intercalate source. In these two examples, sulfuric acid or carboxylic acid serves as an intercalate while nitric acid or hydrogen peroxide serves as an oxidizing agent in an intercalant-oxidizer mixture. The MCMBs are simply immersed in such a mixture at a desired temperature (typically 10-80° C.) for a length of time sufficient for effecting the chemical oxidation-based intercalation reaction;

(b) rapidly heating the intercalated MCMBs to a high temperature for a desired length of time sufficient for producing exfoliated MCMBs (e.g., 150° C.-1,100° C. in the cases where a mixture of an acid and an oxidizing agent is used as an intercalate). The carboxylic acid intercalation is preferred as the subsequent exfoliation step in this case does not involve the evolution of undesirable species, such as $NO_x$ and $SO_x$ which are common by-products of exfoliating conventional sulfuric or nitric acid-intercalated graphite compounds; and, optionally, (c) subjecting the exfoliated MCMBs to a mechanical shearing treatment (e.g., using a rotating-blade mill, air mill, pressurized gas mill, ball mill, or untrasonicator) to produce the desired nano-scaled graphene platelet.

The carboxylic acid, containing only C, H, and O atoms, may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anhydrides thereof, reactive carboxylic acid derivatives thereof, and combinations thereof. In place of the carboxylic acids, the anhydrides or reactive carboxylic acid derivatives such as alkyl esters can also be employed. Representative of alkyl esters are methyl formate and ethyl formate. The most preferred carboxylic acids are formic acid and acetic acid.

Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Among the polycarboxylic acids, citric acid is preferred due to its availability and low cost.

Carboxylic acids can be intercalated into MCMBs both chemically and electrochemically. The carboxylic acid-intercalated MCMBs can be easily exfoliated by rapidly heating the intercalated fiber a desired exfoliation temperature. An advantage of such a carboxylic acid-intercalated fiber in comparison with sulfuric acid-intercalated material is that only H, C and O are released into the atmosphere during the exfoliation process. Depending on the applied current density (in the case of electrochemical intercalation) and the reaction time, an expansion volume of from 100-200 ml/g, at 400-800° C., and volatile content of 10-20 wt %, could be obtained. The residual sulfur content in the expanded graphite is no more than the sulfur impurity level of the original graphite flakes since the process is totally sulfur free, as opposed to more than 1,000 ppm of sulfur typically found in conventional exfoliated graphite manufactured from a sulfuric acid-intercalated GIC. Furthermore, the exfoliated MCMBs and subsequent NGPs do not contain additional corrosive species such as chlorine, fluorine, nitrogen, and phosphor.

The mechanical shearing treatment, used to further separate graphite platelets or flakes of the exfoliated MCMBs and possibly reduce the flake size, preferably comprises using air milling (including air jet milling), ball milling, mechanical shearing (including rotating blade fluid grinding), any fluid energy based size-reduction process, ultrasonication, or a combination thereof.

In the case of electrochemical intercalation, the desired NGPs with either an ultra-low thickness (<1 nm) or a small length/width dimension (e.g., <100 nm) may be obtained by a method comprising: (a) forming an acid-intercalated MCMBs (e.g., already heat-treated at a temperature up to 1,400° C.) by an electrochemical reaction which uses an acid (e.g., formic acid, nitric acid, or a carboxylic acid) as both an electrolyte and an intercalate source, the MCMBs as an anode material, and a metal or graphite as a cathode material, and wherein a current is imposed upon the cathode and the anode at a current density for a duration of time sufficient for effecting the electrochemical reaction; (b) exposing the intercalated MCMBs to a thermal shock to produce exfoliated fiber; and, optionally, (c) subjecting the exfoliated product to a mechanical shearing treatment to produce the nano-scaled graphene platelets. The exfoliation step preferably comprises heating the intercalated graphite to a temperature in the range of 150-1,100° C. for a duration of 10 seconds to 2 minutes, most preferably at a temperature in the range of 400-600° C. for a duration of 30-60 seconds.

Figure 2:
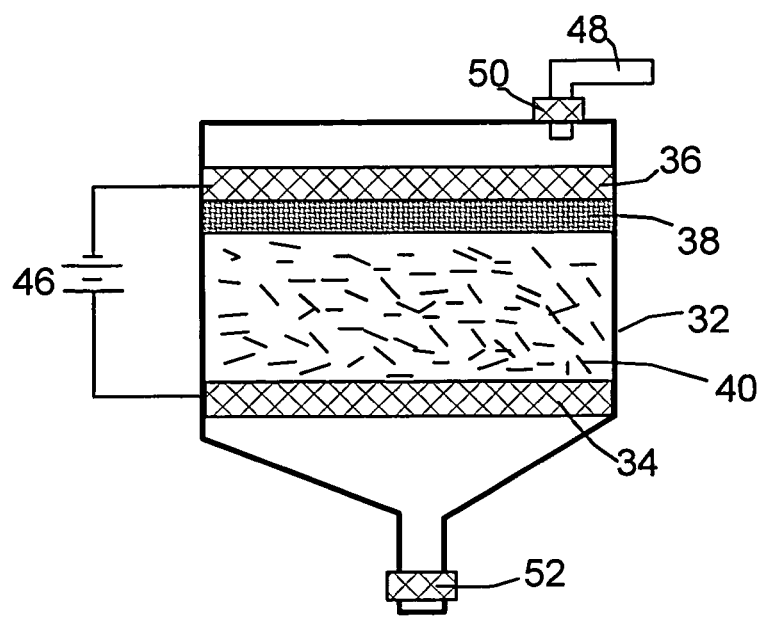
FIG. 2 Schematic of an apparatus that can be used to electro-chemically intercalate MCMBs.
Figure 3A:
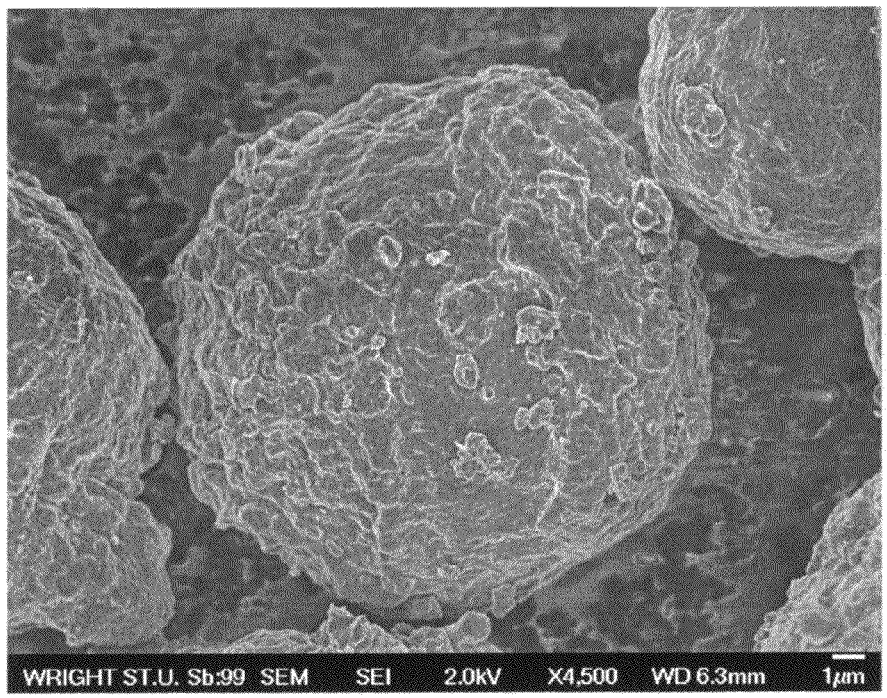
FIG. 3 (A) A scanning electron micrograph of MCMBs and (B) A transmission electron micrograph of several overlapped NGPs obtained from MCMBs.
Figure 3B:
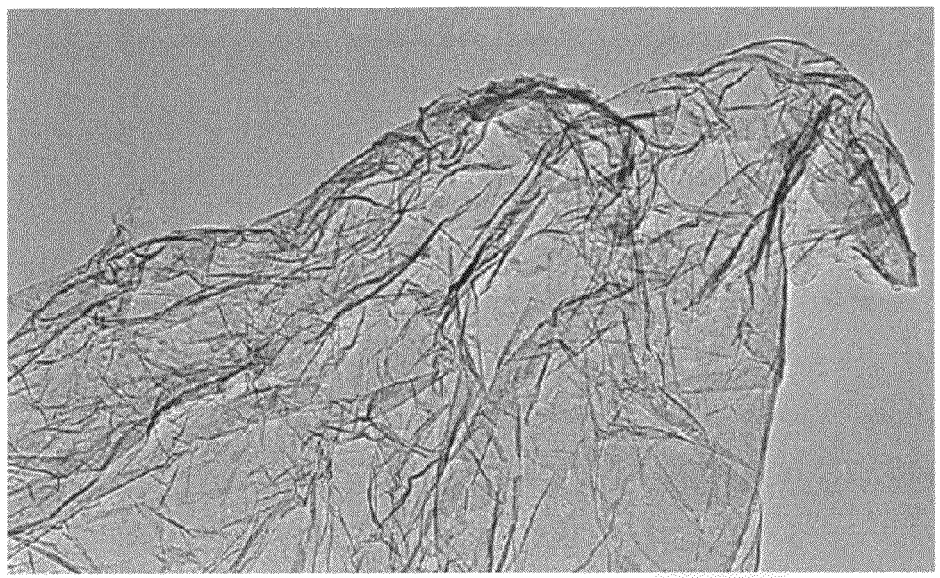

Schematically shown in FIG. 2 is an apparatus that can be used for electrochemical intercalation of MCMBs according to a preferred embodiment of the present invention. The apparatus comprises a container 32 to accommodate electrodes and electrolyte. The anode is comprised of multiple MCMB particles 40 that are dispersed in an electrolyte (e.g., a carboxylic acid, which is also an intercalate) and are supported by a porous anode supporting element 34, preferably a porous metal plate, such as platinum or lead. The MCMBs 40 preferably form a continuous electron path with respect to the anode support plate 34, but are accessible to the intercalate. An electrically insulating, porous separator plate 38 (e.g., Teflon fabric or glass fiber mat) is placed between the anode and the cathode 36 (e.g., a porous graphite or metal plate) to prevent internal short-circuiting. A DC current source 46 is used to provide a current to the anode support element 34 and the cathode 36. The imposing current used in the electrochemical reaction preferably provides a current density in the range of 50 to 600 A/m$^2$, most preferably in the range of 100 to 400 A/m$^2$. Fresh electrolyte (intercalate) may be supplied from an electrolyte source (not shown) through a pipe 48 and a control valve 50. Excess electrolyte may be drained through a valve 52.

It may be noted that, in a traditional GIC obtained by intercalation of a laminar graphite material, the intercalant species may form a complete or partial layer in an inter-layer space or gallery. If there always exists one graphene layer between two intercalant layers, the resulting graphite is referred to as a Stage-1 GIC. If n graphene layers exist between two intercalant layers, we have a Stage-n GIC. It is generally believed that a necessary condition for the formation of all single-sheet NGPs is to have a perfect Stage-1 GIC for exfoliation. Even with a Stage-1 GIC, not all of the graphene layers get exfoliated for reasons that remain unclear. Similarly, exfoliation of a Stage-n GIC (with n>5) tends to lead to a wide distribution of NGP thicknesses (mostly much greater than n layers). In other words, exfoliation of Stage-5 GICs often yields NGPs much thicker than 10 or 20 layers. Hence, a major challenge is to be able to consistently produce NGPs with well-controlled dimensions from conventional acid-intercalated graphite.

Quite surprisingly, the majority of NGPs obtained from MCMBs are very thin, mostly much thinner than 2 or 3 nm and many are single graphene sheets or contain only 2-3 graphene sheets. Further, the NGPs produced from MCMBs (heat-treated at a temperature <1,400° C.) typically have a length or width smaller than 100 nm, mostly smaller than 30 nm, and, in many cases, smaller than 10 nm. The NGPs with a length or width greater than 2 µm can be obtained from intercalation and exfoliation of MCMBs heat-treated at a temperature >2,500° C. (e.g., at 2,800° C. or higher).

MCMBs can also be intercalated with an alkali metal. For instance, an MCMB sample may be heated to 200° C. in an evacuated tube in the presence of potassium melt to form an intercalated MCMB product that contains a stage-1 intercalation compound. The intercalated MCMB sample is then brought in contact with a liquid, such as methanol, ethanol, a hydroxylic solvent, or a solvent containing water. Rapid exfoliation of MCMBs can occur in ethanol, creating thin NGPs which are often naturally separated in ethanol without a need for a subsequent mechanical shearing treatment.

More specifically, MCMBs can be intercalated with alkali (Li, Na, K, Rb, Cs), alkaline earth (Ca, Ba, Sr), or lanthanide metals (Eu, Yb, Sm, Tm) by five different methods: (1) The larger alkali metals (K, Rb, Cs) intercalate MCMBs readily by heating at 200° C. Lithium can be intercalated into MCMBs, but only at higher temperatures and/or pressures. Sodium intercalation is difficult, but can be accomplished using high reaction temperatures (500-600° C.) for 1 week. Intercalation using the alkaline earth (Ca, Ba, Sr) or lanthanide metals (Eu, Yb, Sm, Tm) also requires high temperatures and long reaction times (similar to lithium intercalation); (2) The MCMB can be intercalated electrochemically using a non-aqueous solvent; (3) An alkali plus naphthalene or benzophenone can be used with a suitable non-aqueous solvent (usually an ether such as tetrahydrofuran); (4) Any of the above mentioned metals (except Li and Na) can be intercalated by dissolving in a liquid ammonia solution to create solvated electrons; and (5). Lithium can be intercalated into MCMBs by using n-butyl lithium in a hydrocarbon solvent (e.g., hexane). For instance, 0.1 grams of MCMBs and an alkali metal (Li, Na, or K) in a large excess amount may be added into 10 mL of a 0.2 mol/dm$^3$ naphthalene solution in an ether, tetrahydrofuran (THF), or 1,2-dimethoxymethane (DME), in a closed flask at room temperature for 3-5 days. The resulting product is alkali metal-intercalated MCMBs, which can then be dried in a vacuum oven for 24 hours. The intercalated MCMBs may then be dispersed in ethanol or methanol to produce exfoliated MCMBs.

Optionally, the exfoliated MCMBs may be subjected to a subsequent mechanical shearing treatment, such as ball milling, air milling, or rotating-blade shearing. With this treatment, multi-layer NGPs are further reduced in thickness, width, and length. In the thickness direction (or c-axis direction normal to the graphene plane), there may be a small number of graphene planes that are still bonded together through the van der Waal's forces that commonly hold the basal planes together in a natural graphite. Typically, there are less than 5 layers of graphene planes, each with length and width from smaller than 1 µm. High-energy planetary ball mills, air jet mills, and rotating blade shearing devices (e.g., Cowles) were found to be particularly effective in separating nano-scaled graphene plates once exfoliated. Since air jet milling, ball milling, and rotating-blade shearing are considered as mass production processes, the presently invented method is capable of producing large quantities of NGP materials cost-effectively. This is in sharp contrast to the production and purification processes of carbon nano-tubes, which are slow and expensive.

The resulting nano graphene platelets, after drying to become a solid powder, may be mixed with a monomer to form a mixture, which can be polymerized to obtain a nanocomposite solid. The platelets can be mixed with a polymer melt to form a mixture that is subsequently solidified to become a nanocomposite solid. NGPs may also be mixed with a polymer dissolved or dispersed in a solvent to obtain a suspension. Upon removal of the solvent, the resulting polymer-NGP mixture may be molded to become a nanocomposite part. NGPs may also be used to reinforce other matrix materials, such as glass, metal, ceramic, organic, or carbon matrices.

nate at a ratio of 4:1:0.05) for several lengths of time (10 minutes, 20 minutes, 30 minutes, 2 hours, and 24 hours). Upon completion of the reaction, in each case, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The dried powder sample was placed in a quartz tube and inserted into a horizontal tube furnace pre-set at a desired temperature. For each group of samples, four exfoliation temperatures were used: 150° C., 300° C., 600° C., and 1,050° C., each for 30 seconds. Each sample was mixed with water and ultrasonicated at a 60 W power for 10 minutes. The dimensions of the resulting NGPs were summarized in Table 1:

TABLE 1

Average length/width (L) and thickness (t) values of NGPs obtained from MCMBs intercalated for different lengths of time and intercalated at different temperatures.

| Intercalation time | Exfoliation T | | | |
| --- | --- | --- | --- | --- |
| | 150° C. | 300° C. | 600° C. | 1,050° C. |
| 10 minutes | L = 675 nm, t = 12 nm | L = 674 nm, t = 4.2 nm | L = 677 nm, t = 2.2 nm | L = 675 nm, t = 2.2 nm |
| 20 minutes | L = 676 nm, t = 2.3 nm | L = 675 nm, t = 2.3 nm | L = 673 nm, t = 2.2 nm | L = 675 nm, t = 1.2 nm |
| 30 minutes | L = 675 nm, t = 1.1 nm | L = 675 nm, t = 1.1 nm | L = 675 nm, t = 1.2 nm | L = 675 nm, t = 1.1 nm |
| 2 hours | L = 492 nm, t = 1.1 nm | L = 675 nm, t = 1.2 nm | L = 675 nm, t = 0.68 nm | L = 675 nm, t = 0.67 nm |
| 24 hours | L = 383 nm, t = 1.2 nm | L = 675 nm, t = 1.2 nm | L = 675 nm, t = 0.67 nm | L = 675 nm, t = 0.68 nm |

The following examples serve to provide the best modes of practice for the present invention and should not be construed as limiting the scope of the invention:

Example 1

Nano-Scaled Graphene Platelets (NGPs) from MCMBs via Halogen Intercalation and Exfoliation Steps MCMB 2528 microbeads were supplied by Alumina Trading, which is the U.S. distributor for the supplier, Osaka Gas Company of Japan. This material has a density of about 2.24 g/cm$^3$; a particle size maximum for at least 95% by weight of the particles of 37 microns; median size of about 22.5 microns and an inter-planar distance of about 0.336 nm. One hundred grams of MCMBs and a proper amount of bromine liquid were sealed in a two-chamber quartz tube with the chamber controlled at 25° C. and bromine at 20° C. for 36 hours to obtain a halogen-intercalated MCMB compound.

Subsequently, approximately ⅔ of the intercalated compound was transferred to a furnace pre-set at a temperature of 200° C. for 30 seconds. The compound was found to induce extremely rapid and high expansions of graphite crystallites. The thickness of individual platelets ranged from one graphene sheets to approximately 10 graphene sheets (average of 2 nm) based on TEM observations.

Example 2

NGPs from Sulfuric Acid Intercalation and Exfoliation of MCMBs

MCMB 2528 (10 grams) were intercalated with an acid solution (sulfuric acid, nitric acid, and potassium permanga- This example demonstrates that, with MCMBs, an intercalation time as short as 10 minutes was adequate for achieving a final NGP thickness of 2.2 nm provided the exfoliation temperature is at least 600° C. Even with an exfoliation temperature as low as 150° C., one could still obtain NGPs with an average thickness of 12 nm. With an intercalation time of 20 minutes or longer, very thin NGPs could be readily obtained. This was the case even when the exfoliation temperature is as low as 150° C. It may be noted that prior art acid-intercalated graphite for NGP production was typically obtained with an intercalation time at least greater than 30 minutes, typically from 1 hour to 96 hours (more than 2 weeks in some cases). The exfoliation temperature was typically from 800° C. to 1,100° C. Thus far, exfoliation of graphite intercalation compound at a temperature as low as 150° C. for the purpose of producing either graphite worms (and subsequent flexible graphite) or NGPs has not been reported. Shorter intercalation times and lower exfoliation temperatures amount to lower energy and product costs, and higher NGP production rates.

Example 3

Hydrogen Peroxide-Assisted, Formic Acid-Intercalated MCMBs

One hundred grams of MCMB-2528 were immersed in a mixture of 50 L of formic acid and 2.5 L of hydrogen peroxide at 45° C. for 24 hours. Following the chemical oxidation intercalation treatment, the resulting intercalated MCMBs were washed with water and dried. The resulting product is a formic acid-intercalated MCMB compound.

Subsequently, the intercalated compound was transferred to a furnace pre-set at a temperature of 800° C. for 30 seconds. The compound was found to induce extremely rapid and high expansions of graphite crystallites. The exfoliated MCMBs were then submitted to a mechanical shearing treatment using a Cowles (rotating blade disperser) for 20 minutes. The thickness of the resulting NGPs was found to range from one graphene sheets to approximately 10 graphene sheets (average of approximately 1.9 nm) based on TEM observations. The NGP sample exhibits a specific surface area of 510 m$^2$/g as measured by the BET method.

Example 4

NGPs from Electrochemical Intercalation of MCMBs

Two grams of MCMBs were used as the anode material and 1 L of nitric acid was used as the electrolyte and intercalate source. The anode supporting element is a platinum plate and the cathode is a graphite plate of approximately 4 cm in diameter and 0.2 cm in thickness. The separator, a glass fiber fabric, was used to separate the cathode plate from the MCMBs and to compress the MCMBs down against the anode supporting element to ensure that the MCMBs are in electrical contact with the anode supporting element to serve as the anode. The electrodes, electrolyte, and separator are contained in a Buchner-type funnel to form an electrochemical cell. The anode supporting element, the cathode, and the separator are porous to permit intercalate (electrolyte) to saturate the MCMBs and to pass through the cell from top to bottom.

The MCMBs were subjected to an electrolytic oxidation treatment at a current of 0.5 amps (current density of about 0.04 amps/cm$^2$) and at a cell voltage of about 4-6 volts for 2-5 hours. These values may be varied with changes in cell configuration and makeup. Following electrolytic treatment, the resulting intercalated MCMBs were washed with water and dried.

Subsequently, approximately ⅔ of the intercalated MCMB sample was transferred to a furnace pre-set at a temperature of 600° C. for 30 seconds. The intercalated MCMBs were found to induce extremely rapid and high expansions of graphite crystallites. An ultrasonicator (operated with a power of 80 W) was used to further separate and down-size the platelets. The thickness of individual platelets were found to range from one graphene sheets to approximately 5 graphene sheets based on TEM observations. The specific surface area, measured by the BET method, was found to be 840 m$^2$/g.

Example 5

Supercritical CO$_2$ Fluid Intercalation

One gram of MCMB-2528 was placed in a 100 milliliter high-pressure, single-compartment vessel with a heating provision. The vessel was capable of being isolated from the atmosphere by security clamps and ring. The vessel was in fluid communication with the high-pressure carbon dioxide by way of piping means and limited by valves. A heating jacket was disposed about the vessel to achieve and maintain the critical temperature of carbon dioxide.

When the vessel was isolated, the pressurized carbon dioxide was introduced therein and maintained at about 1,100 psig (pressure of 76 bars). Then, the vessel was heated to about 70° C. at which the supercritical conditions of carbon dioxide were achieved and maintained for about 1 hour to effect intercalation. Then, the vessel was immediately depressurized at a rate of about 3 milliliters per second, thus catastrophically lowering the pressure within the vessel. This was accomplished by opening a connected blow-off valve of the vessel. As a result, exfoliated MCMBs were formed.

After a mechanical shearing treatment in a laboratory-scale Cowles rotating blade device for 15 minutes, the resulting NGPs exhibit a thickness ranging from one graphene sheet to approximately 5 graphene sheets based on TEM observations. The length/width dimensions were found to be between 0.7 and 2.2 μm.

Example 6

Gas Intercalation of Low Temperature Heat-Treated MCMBs

MCMBs for this study were prepared as follows: Petroleum pitch (having an ash content of 0.05%, carbon content of 89.5%, pyridine insolubles of 1.4%, and other balance toluene insolubles) was mixed with 2% carbon black and maintained in an autoclave at 410° C. under a nitrogen environment for 4.5 hours. The resulting mixture was subjected to pyridine extraction to obtain meso-phase spheres. Approximately one gram each of five meso-phase sphere samples was subjected to a heat treatment at 700° C., 1000° C., 1,400° C., 2,000° C., and 2,500° C., respectively, to obtain four MCMB samples.

Approximately 0.5 grams of the four MCMB samples was sealed in a helium gas-filled steel container at 150° C. and 6 atm for 2 hours to yield the desired gas-intercalated MCMBs. Subsequently, the exit valve was opened to release gas out of the chamber at room temperature. The MCMBs were exfoliated to a good extent. The exfoliated samples were ball-milled for 24 hours. The milled products were separately poured into ethanol and found to be well separated. The thickness of individual platelets was found to range from single graphene sheet to approximately 5 graphene sheets. These thickness values appear to be relatively independent of the MCMB heat treatment temperature. However, the average length/width of the NGPs was found to vary with the heat treatment temperature (strongly when higher than 1,400° C.), ranging from 7.5 nm (heat treatment temperature of 700° C.), 8.4 nm (1,000° C.), 9.4 nm (1,400° C.), 65 nm (2,000° C.), and 345 nm (2,500° C.), respectively.

In conclusion, the presently invented method of producing NGPs has the following main advantages:

(1) The method is capable of readily producing ultra-thin graphene platelets, with an average thickness smaller than 2 nm or thinner than 6 graphene layers.
(2) The method is simple, fast, and less energy-intensive. The method could obviate the need to use a long intercalation time, a high exfoliation temperature, or a subsequent mechanical shearing treatment.
(3) The method does not need to utilize an undesirable intercalant, such as sulfuric acid. Many environmentally benign intercalants are able to effectively intercalate MCMBs.
(4) The method enables the production of NGPs with ultra-small length/width values, e.g., those with a length smaller than 100 nm or even 10 nm.
(5) This effective and consistent method is amenable to low-cost, mass production of ultra-thin, nano-scaled platelets.
(6) The ultra-thin, nano-scaled graphene platelets produced can be readily dispersed in a liquid to form a suspension, which is a precursor to a nanocomposite structure.

The invention claimed is:

1. A method of producing separated nano-scaled graphene platelets having a thickness less than 3 nm, said method consisting of:
   a) intercalating a supply of meso-carbon microbeads (MC-MBs) to produce intercalated MCMBs; and
   b) exfoliating said intercalated MCMBs at a temperature and a pressure for a sufficient period of time to produce said nano-scaled graphene platelets.

2. The method of claim 1 wherein said graphene platelets have a thickness less than 1 nm.

3. The method of claim 1 wherein said graphene platelets comprise single graphene sheets, double-layer graphene sheets, or triple-layer graphene sheets.

4. The method of claim 1 wherein said graphene platelets have a length less than 100 nM.

5. The method of claim 1 wherein said supply of MCMBs is obtained from a petroleum heavy oil or pitch, coal tar pitch, polynuclear hydrocarbon, or a combination thereof.

6. The method of claim 1 wherein said supply of MCMBs is treated at a temperature in the range of 500° C. and 3,000° C.

7. The method of claim 1 wherein said supply of MCMBs is obtained from heat-treating mesophase carbon spheres at a temperature in the range of 500° C. and 1,400° C. and said graphene platelets have a length smaller than 10 nm.

8. The method of claim 1 wherein said supply of MCMBs is obtained from heat-treating mesophase carbon spheres at a temperature higher than 2,500° C. and said graphene platelets have a length greater than 350 nm.

9. The method of claim 1 wherein said step of intercalation includes intercalating an intercalate into said supply of meso-carbon microbeads wherein said intercalate is selected from an acid, an oxidizing agent, a mixture of an acid and an oxidizing agent, a halogen molecule or inter-halogen compound, a metal-halogen compound, an alkali metal, a mixture or eutectic of two alkali metals, an alkaline earth metal, an alkali metal-organic solvent mixture, or a combination thereof.

10. The method of claim 1 wherein said step of intercalation comprises intercalating an intercalate into said supply of meso-carbon microbeads wherein said intercalate is selected from acetic acid, formic acid, or a carboxylic acid.

11. The method of claim 10 wherein said carboxylic acid is selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof.

12. The method of claim 1 wherein said step of intercalating comprises chemical intercalating, electrochemical intercalating, gaseous phase intercalating, liquid phase intercalating, supercritical fluid intercalating, or a combination thereof.

13. The method of claim 12 wherein said electrochemical intercalating comprises intercalating a carboxylic acid into the MCMBs by imposing a current between said MCMBs and a metal or graphite material for a duration of time sufficient for producing the interacted MCMBs.

14. The method of claim 13 wherein said current imposed to said supply of MCMBs is at a current density in the range of 50 to 600 A/m$^2$.

15. The method of claim 1 wherein said step of intercalating is completed in 30 minutes or less.

16. The method of claim 1 wherein said step of intercalating is completed in 15 minutes or less.

17. The method of claim 1 wherein said step of exfoliating said intercalated MCMBs comprises exposing said intercalated MCMBs to a temperature in the range of 150° C. to 1,100° C.

18. The method of claim 1 wherein said step of intercalation comprises intercalating an acid into said MCMBs and said step of exfoliating said intercalated MCMBs comprises exposing said intercalated MCMBs to a temperature in the range of 150° C. to 300° C.

19. The method of claim 1 further comprising a step of contacting at least a part of the exfoliated MCMBs with a liquid selected from water, methanol, ethanol, acetone, an organic solvent, or a combination thereof.

20. The method of claim 1 wherein said step of intercalation consists of exposing said MCMBs to a gaseous or supercritical fluid environment at a first temperature and a first pressure and said step of exfoliation comprises subjecting said intercalated MCMBs to a second temperature and a second pressure, wherein said first temperature is different from said second temperature or said first pressure is different from said second pressure.

21. The method of claim 20 wherein said gaseous or supercritical fluid environment comprises carbon dioxide.

* * * * *